Figure 1:
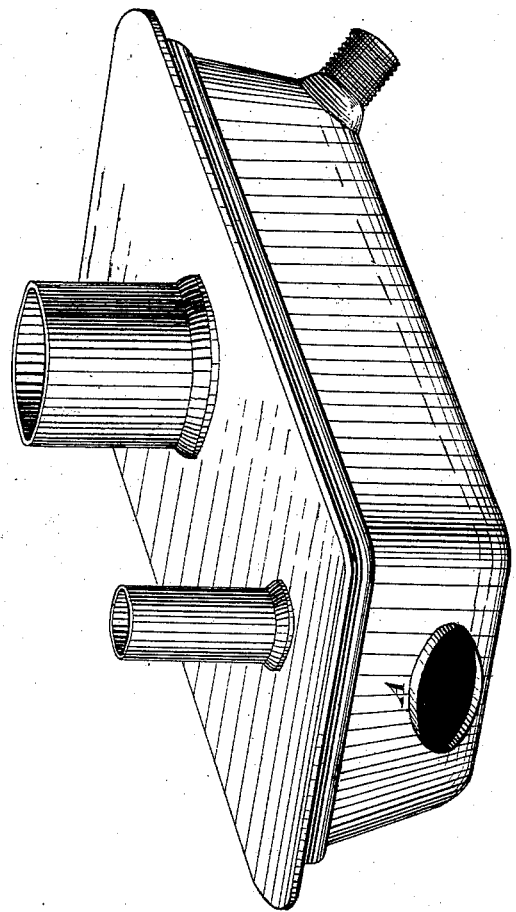

E. W. MEYER.
Service Box.

No. 201,814.

2 Sheets—Sheet 1.

Patented March 26, 1878.

Attest:
John F. Meyer
Charles D. Meyer

Inventor:
Edward W. Meyer,
per
John Francis Meyer,
Atty.

E. W. MEYER.
Service Box.
No. 201,814. Patented March 26, 1878.
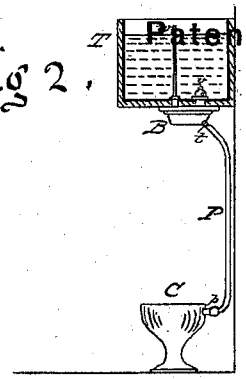
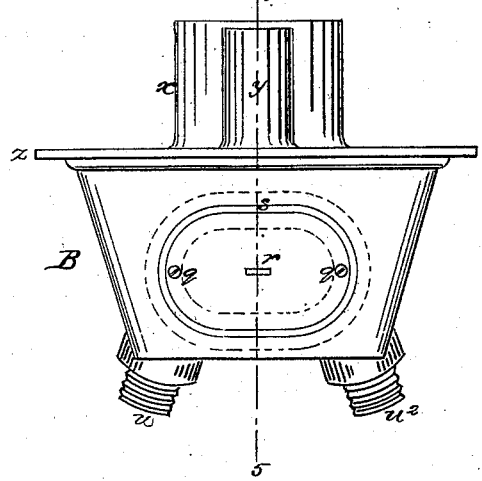
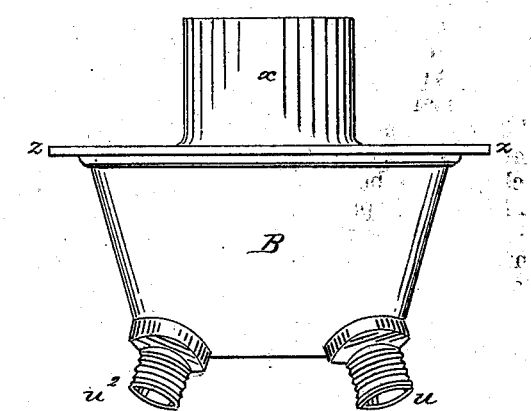
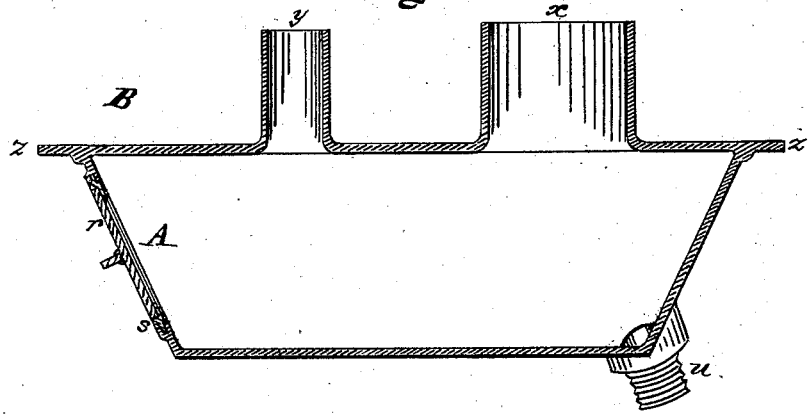
Witnesses
Jas. L. Ewin
Wm A. Hain
Inventor,
Edward W. Meyer
Knight Bros.
Attorneys.

UNITED STATES PATENT OFFICE.

EDWARD W. MEYER, OF NEW YORK, N. Y.

IMPROVEMENT IN SERVICE-BOXES.

Specification forming part of Letters Patent No. 201,814, dated March 26, 1878; application filed August 20, 1877.

*To all whom it may concern:*

Be it known that I, EDWARD W. MEYER, of the city and county of New York, in the State of New York, have invented a new and useful Improvement in Service-Boxes for Water-Closet Apparatus, of which the following is a full, clear, and exact specification.

This invention relates to what are known by plumbers as "service-boxes," the same being attached to the bottoms of the elevated tanks used for flushing pan water-closets, for the purpose of insuring the descent of a sufficient quantity of water to fill the pan after the valve is closed.

The service-boxes heretofore in use have been made by hammering sheet-lead into shape over a mold, to form the bottom and sides, and soldering said molded part to a top plate, in which short sections of pipe are likewise soldered, to form necks for the valve and air-pipe. The sheet-lead and solder thus consumed are very expensive, and considerable waste or scrap is necessarily formed. The operation of thus making a box is also a slow and costly one, requiring the services of an expert plumber, and an additional solder-joint remains to be made by job-work between the box and the pipe which leads to the bowl when the former is placed in position.

Boxes made of sheet-lead, as above described, are also very liable to imperfect construction. Unless the surfaces are perfectly tinned before soldering, the joints will sweat or leak in use. Minute leaks, through which the water sweats, are sometimes formed—for example, in the main joint below the top plate—by the great heat which is applied to the latter in soldering the said necks thereon, said heat making the tin of said joint beneath said top plate to run or part, and this is very difficult to detect before the box is attached.

The pipe connecting the box and bowl, as above described, is from five to seven feet long, and consequently quite heavy. In soldering this into the sheet-lead the latter necessarily becomes hot, and the weight of the pipe causes the hole to expand and the pipe to slip in. Consequently the end of said pipe sometimes projects considerably within the box, causing more or less water to remain therein, and such water freezes and strains the box in winter, if the closet be at all exposed.

When the valve leaks the box is in such cases liable to be filled with ice and burst or rendered inoperative. The solder also runs into the pipe sometimes, forming projections, on which obstructions will catch so as to clog the pipe.

Besides the absence of any neck for attaching said pipe leading to the bowl, said sheet-lead boxes are also deficient in having no provision for access in case of stoppage from any cause. A plumber must always be sent for. He first applies a force-pump, which strains all the joints, and particularly the putty-joint between said pipe and the arm of the bowl, and if the pump fail to dislodge the obstruction a hole must be cut in the box or pipe, and sometimes in each, for the insertion of a rattan; then the plumber must repair the box and pipe with a soldering-iron, and the whole operation may require to be repeated in a short time, owing to the exposure of the tanks, which, besides dust and ordinary sediment, receive plaster, paper, feathers, &c., and these pass into the service-boxes, and there frequently remain until removed by the plumber.

Another objection to said sheet-lead boxes is, that they afford no means for regulating the descent of the water.

When a closet is fitted up with a round bowl, if the tank is too high, the ordinary stream of water will circulate in the bowl so forcibly as to overflow. This has been met by flattening the pipe with a hammer, which is an unsightly expedient, and by lengthening the valve-wire, which reduces the quantity of water admitted to the box, and leaves the pan empty when the handle is quickly dropped, thus admitting stench and foul gases to the apartment.

The present invention consists in an improved service-box, which is free from the said objections to those heretofore in use, as hereinafter set forth.

Figure 1 of the accompanying drawing is a perspective view of a service-box, illustrating this invention. Fig. 2 is a sectional diagram on a smaller scale, illustrating the use of said box. Fig. 3 is a front view of the box detached, as shown in Fig. 1. Fig. 4 is a rear view of the same; and Fig. 5 is a vertical longitudinal section on the line 5 5, Fig. 3.

Like letters of reference indicate corresponding parts in the several figures.

This improved service-box B is made of pure lead by casting the same in molds, and is constructed in imitation of the sheet-lead boxes, with beveled sides and flat bottom and top, the latter forming a marginal flange, $z$, through which screws are inserted into the wooden bottom of an overhead tank, T, so as to attach said box, as illustrated in Fig. 2.

Necks $y$ $x$ at top are provided, to project through the bottom of the tank and be turned over and soldered down on the lead lining of the same, an air-pipe, $w$, and a valve, $v$, being subsequently soldered in the respective necks.

At its rear end the box is provided with two hard-metal "spuds," $u$ $u^2$, which are short tubes having screw-threaded outer ends, to provide for attaching the pipe P, Fig. 2, which leads to the closet-bowl C, by means of a screw-coupling, $t$, the unused spud being closed by a screw-cap. The shanks of the spuds are made angular, so that they will not turn, and being surrounded by the molten metal in the mold, they are securely and solidly attached. The spuds are arranged at the lower corners of the box, so as to project at opposite angles, and their inner ends are prevented from projecting into the chamber of the box by the core used in casting. Any lead that runs into the spuds is readily cut out in finishing the box.

In the front end of the box an opening, A, is formed to give convenient access to the interior of the box at all times. Said opening has a hard-metal frame, $s$, around which the lead is cast in the mold, so as to embrace the same, in the manner represented in Fig. 5. This frame receives a cap, $r$, which is attached by screws $q$ $q$, a packing of putty or a rubber gasket being interposed between the cap and its seat.

The improved box can be cast in several shapes, to suit different tastes, and with either one or two spuds.

Either brass or galvanized iron will answer for the hard-metal parts; and I propose, as an inferior modification, to cast the entire box of iron and galvanize it.

Another modification which I have contemplated consists in casting the improved box in halves, so as to facilitate molding, the joint to be of any approved form. The improved box may also be cast without the top necks $y$ $x$, so that it can be used by plumbers in relining old tanks, when holes previously cut must be fitted. The cap $r$ may also be made in the form of a screw-plug, or any other suitable form, if preferred, and the shape and proportions of the spuds may be varied without departing from this invention.

The improved box possesses the following advantages over those of sheet-lead:

First. It is adapted to be made in one piece without solder, and to be furnished to the job plumber ready for use.

Second. Cheaper material may be used in its manufacture, and there is less labor involved in this operation.

Third. The pipe leading to the bowl is quickly attached by means of a screw-coupling.

Fourth. The box is readily made so as to drain itself of all water, so as not to freeze up.

Fifth. There is nothing to collect obstructions at the upper end of said pipe.

Sixth. The pair of spuds provide for the use of the box in connection with a pipe in either corner of the closet.

Seventh. Said spuds also facilitate the regulation of the force of the water. All that is necessary is to cut a larger or smaller hole in the gasket of the coupling.

Eighth. In the event of any obstruction in the pipe P, it will only be necessary to break the solder-joint $p$ between said pipe and the neck of the bowl. The pipe can then be taken down, cleaned, and replaced in a few moments.

Ninth. Any obstructions in the box or at the upper end of said pipe can be readily cleaned out by simply removing the cap $r$, and by doing this first it will not usually be necessary to disturb the pipe.

Tenth. No soldering is required in restoring the parts after cleaning out the apparatus, and the box remains as good as new after an indefinite number of such operations.

The following is what I claim as new and of my own invention, and desire to secure by Letters Patent, namely:

1. As a new article of manufacture, a service-box cast in one piece, substantially as herein described.

2. A service-box provided with one or more spuds, so that the pipe leading from said box may be attached by a screw-coupling.

3. A cast-metal service-box provided with an opening, A, in its front end to provide for cleaning the same, said opening having a frame, $s$, cast in the body of the box, and fitted with a cap, $r$, substantially as herein shown and described.

EDWARD W. MEYER.

Witnesses:
JAS. L. EWIN,
WM. A. MAIN.